United States Patent
Brown et al.

(10) Patent No.: US 6,829,419 B1
(45) Date of Patent: Dec. 7, 2004

(54) FIBER ARRAY ALIGNMENT

(75) Inventors: Robert Brown, Boca Raton, FL (US); Jeffrey E. Leclaire, Boca Raton, FL (US); Huizong Lu, Coral Springs, FL (US); John L. Sullivan, Boca Raton, FL (US)

(73) Assignee: Zygo Corporation, Middlefield, CT (US)

(*) Notice: Subject to any disclaimer, the term of this patent is extended or adjusted under 35 U.S.C. 154(b) by 280 days.

(21) Appl. No.: 10/067,522

(22) Filed: Feb. 4, 2002

Related U.S. Application Data

(60) Provisional application No. 60/340,915, filed on Oct. 30, 2001, provisional application No. 60/275,863, filed on Mar. 14, 2001, and provisional application No. 60/275,864, filed on Mar. 14, 2001.

(51) Int. Cl.[7] .................................................. G02B 6/26
(52) U.S. Cl. ............................ 385/52; 385/147; 257/48
(58) Field of Search .............................. 385/30, 31, 88, 385/89, 147, 1, 14, 49, 50; 257/48

(56) References Cited

U.S. PATENT DOCUMENTS

| | | | |
|---|---|---|---|
| 4,730,198 A | * | 3/1988 | Brown et al. ................. 385/89 |
| 4,897,711 A | * | 1/1990 | Blonder et al. ............... 257/48 |
| 5,135,590 A | | 8/1992 | Basavanhally et al. |
| 5,185,846 A | | 2/1993 | Basavanhally et al. |
| 5,243,671 A | * | 9/1993 | Koteles et al. ................. 385/31 |
| 5,506,928 A | | 4/1996 | Evans et al. |
| 5,857,047 A | | 1/1999 | Strand et al. |
| 5,871,559 A | | 2/1999 | Bloom |
| 5,926,594 A | | 7/1999 | Song et al. |
| 6,003,341 A | | 12/1999 | Bloom |
| 2002/0037132 A1 | * | 3/2002 | Sercel et al. .................. 385/30 |
| 2002/0131727 A1 | * | 9/2002 | Reedy et al. .................. 385/88 |

FOREIGN PATENT DOCUMENTS

| | | |
|---|---|---|
| JP | 56077814 A2 | 6/1981 |
| JP | 63113508 A2 | 5/1988 |
| JP | 07056073 A2 | 3/1995 |
| JP | 09145947 A2 | 6/1997 |

OTHER PUBLICATIONS

Robert E. Brown, Jeffrey E. LeClaire, Huizong Lu, John L. Sullivan, "Automated Placement of Optical Fibers and Manufacture of Fiber Arrays", Feb. 26, 2001, Ser. No. 60/271,518.

* cited by examiner

*Primary Examiner*—Akm Enayet Ullah
(74) *Attorney, Agent, or Firm*—Fish & Richardson P.C.

(57) ABSTRACT

A method of aligning fibers on a substrate includes placing a grooved substrate on a base next to an opening formed through a top surface of the base, flowing air through the opening to draw the plurality of fibers down towards the top surface of the substrate or base, placing a set of fibers to extend over the substrate or base and over the opening and bonding the plurality of fibers to the substrate.

7 Claims, 4 Drawing Sheets

FIBER ARRAY ALIGNMENT

CLAIMS OF PRIORITY

This application claims priority under 35 USC §119(e) to U.S. Patent Application Ser. No. 60/275,864, filed on Mar. 14, 2001, the entire contents of which are hereby incorporated by reference.

This application also claims priority under 35 USC §119 (e) to U.S. Patent Application Ser. No. 60/275,863, filed on Mar. 14, 2001, the entire contents of which are hereby incorporated by reference.

This application claims priority under 35 USC §119(e) to U.S. Patent Application Ser. No. 60/340,915, filed on Oct. 30, 2001, the entire contents of which are hereby incorporated a by reference.

TECHNICAL FIELD

This invention relates to manipulating and aligning fibers into an array.

BACKGROUND

It is often desirable to align multiple fibers into an array of parallel fibers. One method of accomplishing this is to place fibers into parallel grooves that have been formed in the surface of a substrate. Typically, the placement of the fibers into the grooves is performed manually and requires careful and precise operations by skilled operators. In some cases, it is desirable to align multiple "etched" fibers, i.e., fibers that have been stripped of their outer protective coatings and then etched to reduce the outer diameter of the fiber.

SUMMARY

According to an aspect of this invention a method of aligning fibers on a substrate includes placing a grooved substrate on a base proximate to an opening formed through a top surface of the base flowing air through the opening to draw the plurality of fibers down towards the top surface of the substrate or base, placing a plurality of fibers to extend over the substrate and over the opening and bonding the plurality of fibers to the substrate or base.

One or more of the following features may also be included. The base may include a substrate holding area formed in the top surface of the base and proximate to the opening, and wherein said placing a substrate on a base further includes placing the substrate within the substrate holding area. The substrate may include a first plurality of grooves formed in a top surface of the substrate and wherein said placing a plurality of fibers further includes placing one of the plurality of fibers within one of the first plurality of grooves. The opening may be horizontally longer in a first dimension than a second dimension relative to the top surface of the base, and wherein said placing the substrate within the substrate holding area further includes placing the substrate proximate to a side of the opening of the first dimension, wherein the first plurality of grooves are substantially perpendicular to the side of the first dimension. The base may include a second plurality of grooves formed in the first surface of said base that are spaced from the substrate holding area, wherein the second plurality of grooves are in substantial alignment with the first plurality of grooves in the top surface of the substrate, and wherein said placing one of the plurality of fibers further includes placing a first section of one of the plurality of fibers within one of the first plurality of grooves formed in the top surface of the substrate and placing a second section of the same one of the plurality of fibers within a corresponding one of the second plurality of grooves formed in the first surface of the base. The substrate may include a second plurality of grooves formed in the top surface of the substrate that are spaced from the first plurality of grooves, wherein the second plurality of grooves are in substantial alignment with the first plurality of grooves, and wherein said placing one of the plurality of fibers further includes placing a first section of one of the plurality of fibers within one of the first plurality of grooves and placing a second section of the same one of the plurality of fibers within a corresponding one of the second plurality of grooves formed in the top surface of the substrate. The method may further include applying a bonding material on the plurality of fibers and placing a holding cap in contact with the bonding material.

According to a further aspect of this invention, a method of aligning fibers includes placing a plurality of fibers on a base to extend over an opening formed through a top surface of the base, flowing air through the opening to draw the plurality of fibers down towards the top surface of the base, positioning each of the plurality of fibers in substantial alignment; and transferring the plurality of fibers to a substrate.

One or more of the following features may also be included. The base may include a first plurality of grooves formed in the top surface proximate to the opening, said method further including placing one of the plurality of fibers within one of the first plurality of grooves. The opening may be horizontally longer in a first dimension than a second dimension relative to the top surface of the base, and wherein said placing a plurality of fibers further includes placing the plurality of fibers substantially perpendicular to a side of the opening of the first dimension. The base may include a second plurality of grooves formed in the first surface that are spaced from the first plurality of grooves, and wherein said placing one of the plurality of fibers further includes placing a first section of one of the plurality of fibers within one of the first plurality of grooves and placing a second section of the same one of the plurality of fibers within a corresponding one of the second plurality of grooves. The method of transferring may further include positioning a first surface of a substrate to contact the plurality of fibers, wherein the first surface of the substrate has a bonding material applied to contact the plurality of fibers. The base may include a plunger slidably coupled to the base, and wherein said transferring the plurality of fibers to a substrate further includes sliding the plunger to contact one of the plurality of fibers and the substrate.

According to a further aspect of this invention an apparatus for aligning fibers on a substrate, the apparatus including a base having a first opening through a top surface, said base having a substrate holding area formed in the top surface of said base proximate to the first opening and a substrate held within the substrate holding area, said substrate having a first plurality of aligned grooves formed in a top surface of the substrate. One or more of the following features may also be included. The first opening may connect to a second opening formed in a second surface of said base. The first opening may be horizontally longer in a first dimension than a second dimension relative to the top surface of said base, and the first plurality of grooves in said substrate are substantially perpendicular to a side of the first opening of the first dimension. The base may include a second plurality of grooves formed in the top surface of said base and spaced away from the substrate holding area, and the second plurality of grooves are in substantial alignment with the first plurality of grooves in the substrate. The spacing between each of the first plurality of grooves may be less than the spacing between each of the second plurality of grooves. The substrate may include a second plurality of grooves formed in the top surface and spaced away from the first set of grooves, and the second plurality of grooves are in substantial alignment with the first plurality of grooves. The spacing between each of the first plurality of grooves may be less than the spacing between each of the second plurality of grooves.

Embodiments of the invention may have one or more of the following advantages. For example, they enable an operator to quickly and easily align a set of fibers on a substrate using the forces associated with a flow of air. They also enable an operator to align fibers with a minimal amount of handling which reduces the possibility of damage to individual fibers. Moreover, by using the fixture and methods of the invention, the forces associated with a flow of air can be used to hold a set of fibers against a substrate, after the fibers are aligned, and allow an application of bonding material to all of the fibers simultaneously, that is, without requiring tacking or bonding of individual fibers as they are placed. Furthermore, some of the embodiments allow for aligning a set of etched fibers into a "fan-out" pattern, i.e., placing a set of etched fiber ends within a set of narrowly-spaced grooves formed in a substrate, and positioning the larger diameter sections of the same set of fibers into a more widely-spaced pattern in an area away from the grooves. The airflow fixture itself may be used to align a set of fibers, using the forces associated with a flow of air, with a transfer of the aligned fibers to a substrate following the alignment.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
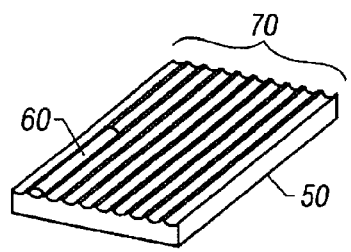
FIG. 1A shows a grooved substrate.
Figure 1B:
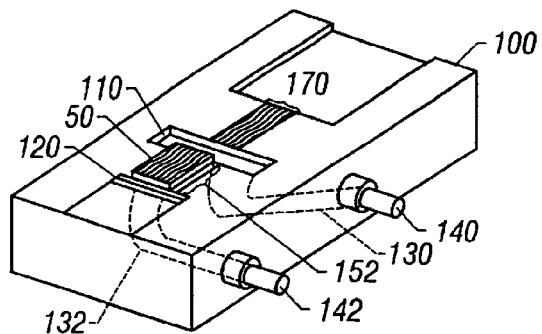
FIGS. 1B–1E show a first embodiment of an airflow fixture holding the grooved substrate of FIG. 1A.
Figure 1C:
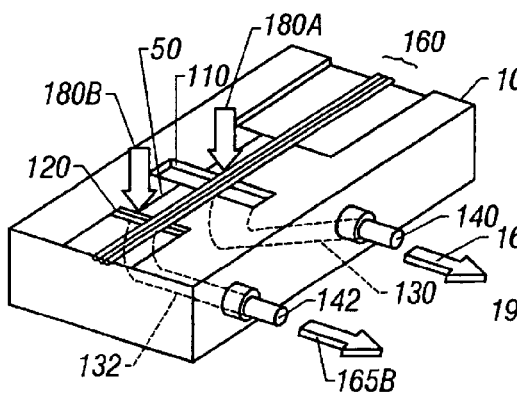
Figure 1D:
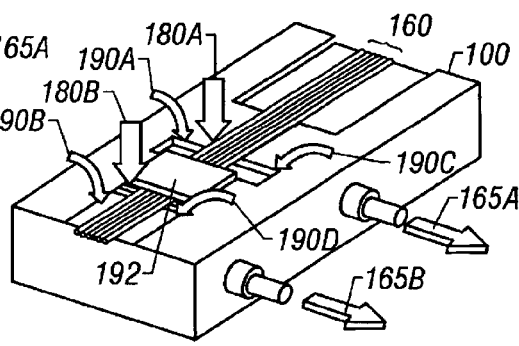
Figure 1E:
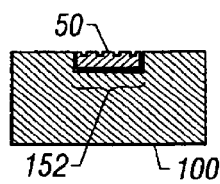

A set of fibers is aligned on a grooved substrate held on an airflow fixture by placing the fibers across the substrate and applying an airflow through an opening in the fixture next to the substrate. The airflow creates differential pressures above and below the fibers causing the fibers to be pulled down onto the substrate and/or the fixture. The slight forces associated with the airflow through the opening enables an operator to adjust the position of the fibers into final alignment within the grooves while the airflow holds the repositioned fibers in place. The airflow is continued until a bonding material and a holding cap are applied over the aligned fibers and the substrate, at which point the substrate and fibers may be removed from the apparatus.

Referring to FIGS. 1A–1E, an airflow fixture 100 that is used to align a set of fibers 160 includes an indented substrate holding area 152 formed into a top surface of fixture 100 next to airflow openings 110 and 120 that are formed through the top surface. Fixture 100 also includes hollow airflow connectors 140 and 142 attached to a side surface of fixture 100. Airflow connectors 140 and 142 are connected to internal airflow channels 130 and 132, respectively, that are formed within fixture 100. In use, a vacuum source (an "airflow source"—not shown) is connected to airflow connectors 140 and 142 to create downward airflows 180A and 180B through airflow openings 110 and 120, respectively, and outward airflows 165A and 165B from connectors 140 and 142, respectively. An operator then places substrate 50 into substrate holding area 152 and then places fibers 160 across openings 110 and 120 and across substrate 50. Downward airflows 180A and 180B create differential pressures that pull fibers 160 down onto the top of substrate 50, i.e., downward airflows 180A and 180B from the top of substrate 50 cause fibers 160 to experience a higher pressure above openings 110 and 120 and a lower pressure below them.

If required, the final positioning of fibers 160 onto substrate 50 is performed manually, by an operator who manipulates fibers 160 with a small instrument, such as a small pick or brush (not shown), while downward airflows 180A and 180B are continued. In use, the operator nudges or brushes fibers 160 into a set of substrate grooves 70 formed longitudinally from end-to-end in a top surface of substrate 50. The forces applied by the operator are sufficient to temporarily overcome the airflow forces produced by the airflow through openings 110 and 120. By temporarily overcoming the airflow forces and nudging or brushing the fibers, the operator is able to reposition the fibers into the grooves 70 on substrate 50. As the full set of fibers 160 is spread out across the substrate 50 and fixture 100, downward airflows 180A and 180B are partially diverted by fibers 160 into sideward airflows 190A–190D. Sideward airflows 190A–190D cause fibers 160 to be pushed against each other and towards the longitudinal center of substrate 50. The airflow is continued after the fibers 160 are positioned and the operator applies a bonding material (not shown), e.g epoxy or glue, to fibers 160 and substrate 50, and then positions a holding cap 192 over and onto the bonding material. The airflow may be turned off or reduced at this point. Holding cap 192 may include a set of grooves formed in the surface contacting fibers 160 that match the alignment pattern of fibers 160.

The airflows 180A, 180B, 190A and 190B are controlled by varying the strength (amount) of airflow applied to the airflow connectors 140 and 142 and the size of the airflow channels 110 and 120.

Fixture 100 also may include grooves 170 formed in the top surface for holding the trailing lengths of fibers 160 that are being placed on substrate 50. Grooves 170 are formed in approximate alignment with substrate grooves 70, when substrate 50 is mounted on fixture 100. The depth of indented substrate holding area 152 and grooves 170 are configured to allow fibers 160 to be approximately parallel to the top surface of fixture 100 when in final position. These depths may vary depending on the diameters of fibers 160 being postioned into grooves 70 and 170. For example, the respective depths may vary depending upon whether etched fibers or full-diameter fiber ends are being positioned into grooves 70 and grooves 170.

Figure 2A:
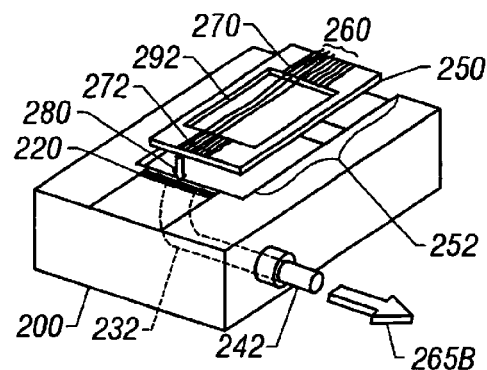
FIG. 2A shows a second embodiment of an airflow fixture holding a second grooved substrate.
Figure 2B:
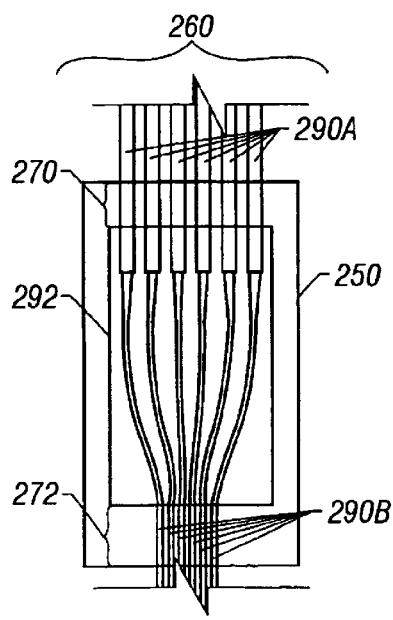
FIGS. 2B–2C shows the second grooved substrate of FIG. 2A.

Referring to FIGS. 2A and 2B, in this alternative embodiment, an airflow fixture 200 that is used to align a set of etched fibers 260 includes an indented substrate holding area 252 formed in a top surface of fixture 200 next to an airflow opening 220 formed through the top surface of fixture 200. Fixture 200 also includes an airflow connectors 242 attached to a side of fixture 200 that is connected to an internal airflow channel 232 that is formed within fixture 200. Each of the individual fibers in set 260 has smaller-diameter etched ends 290B and larger-diameter non-etched sections 290A. Grooved substrate 250 includes, at one end, a narrowly-spaced set of grooves 272 for holding etched fiber ends 290B and at the other end a more widely-spaced set of grooves 270 for holding non-etched sections 290A. In use, etched fibers 260 are aligned on substrate 250 by placing substrate 250 into substrate holding area 252 and placing etched fibers 260 across substrate 250 and airflow opening 220. An airflow source (not shown) is connected to airflow connector 242 to create a downward airflow 280 through opening 220 and an outward airflows 265B from fixture 200. As described before in connection with the first embodiment, sideward airflow forces (not shown) are increased as etched fibers 260 are spread across substrate 250. These sidewards airflow forces are useful during the placement of etched fibers 260 since the purpose of the etching (i.e, reducing the outer diameter of the fiber) is to place the fiber cores closer together than the diameter of a non-etched fiber would allow. In more detail, when positioning etched sections of fibers 260 together requires fibers 260 to bend at a point between the etched and non-etched section of the fibers, since the larger diameter section (i.e., the non-etched section) of the fibers cannot be placed as closely together. The sideward airflow forces overcomes the forces created by the bending of the fibers and allows the etched sections of the fibers to be aligned to, and held within, grooves 272. Also, as described before in connection with the first embodiment, downward airflow 280 enables an operator to adjust the position of etched fiber ends 290B into narrowly-spaced grooves 272, and the continued airflow 280 holds the placed fibers within grooves 272 while the non-etched sections 290A are placed within more widely-spaced grooves 270. An operator uses the same procedure of bonding and capping the fibers in place that was previously described. A holding cap used to hold fibers 260 in place may include a set of grooves formed in the surface contacting fibers 260 that match the alignment pattern of fibers 260.

Figure 2C:
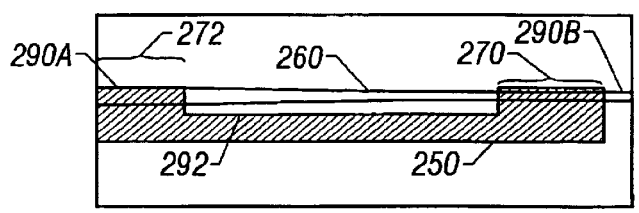

Referring to FIGS. 2B and 2C, substrate 250 includes a recessed area 292, formed in the top surface of substrate 250 between grooves 270 and 272. Recessed area 292 allows a fiber that has been placed within a groove to completely seat into the groove, i.e., allowing the sections of fibers in the recessed area 292 to lie in the same plane as the fiber held within the grooves.

Figure 3A:
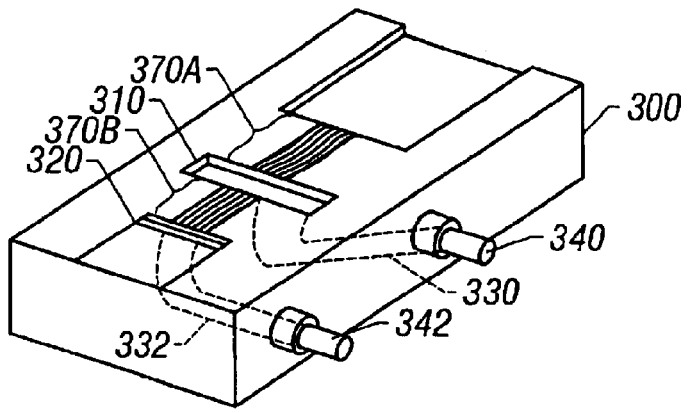
FIGS. 3A–3C shows a third embodiment of an airflow fixture.
Figure 3B:
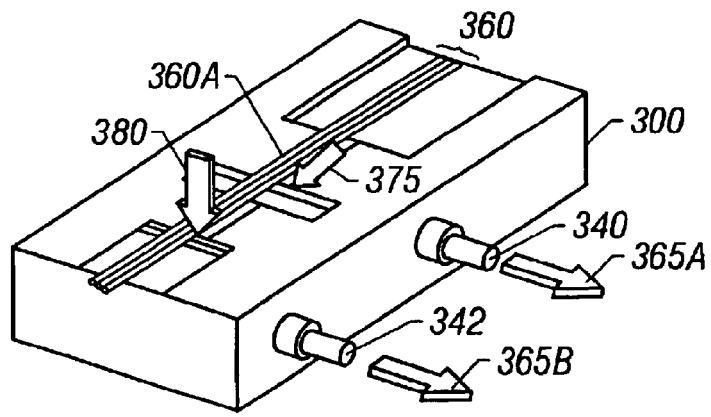
Figure 3C:
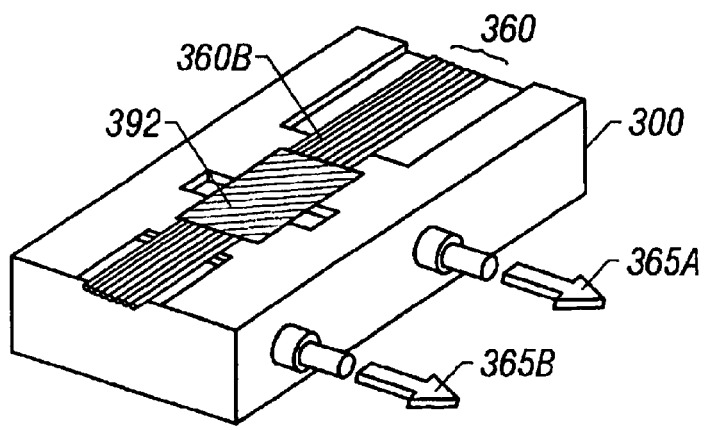

Another way of producing a fiber array is to first align a set of fibers on a surface of an airflow fixture, and then transfer the aligned fibers to a holding substrate. Referring to FIGS. 3A–3C, in this alternative embodiment, airflow fixture 300 may include one or two sets of grooves, 370A and/or 370B, formed in the top surface of fixture 300. Fixture 300 also includes a first airflow opening 320 formed through the top surface of fixture 300 at one end of grooves 370B and a second airflow opening 310 formed between grooves 370B and 370A. Fixture 300 also includes hollow airflow connectors 342 and 340 that are attached to a side surface of fixture 300 and are connected to airflow opening 320 and 310, respectively, by internal airflow channels 332 and 330, respectively. In use, an airflow source is connected to airflow connectors 342 and 340 to create downward airflows 380 and 375, respectively, into airflow openings 320 and 310, respectively. Downward airflows 380 and 375 enable an operator to position a set of fibers 360 within the area of the grooves 370A and/or 370B. The airflow is continued after fibers 360 are positioned onto fixture 300. The operator then bonds the aligned fibers 360 to a holding substrate 392 by applying a bonding material (not shown) to a bottom surface of substrate 392 and then positioning the bottom surface of substrate 392 over and against fibers 360. The holding substrate 392 may include a set of grooves formed in a bottom surface of holding substrate 392 to assist in the alignment of substrate 392 to fibers 360.

Figure 4:
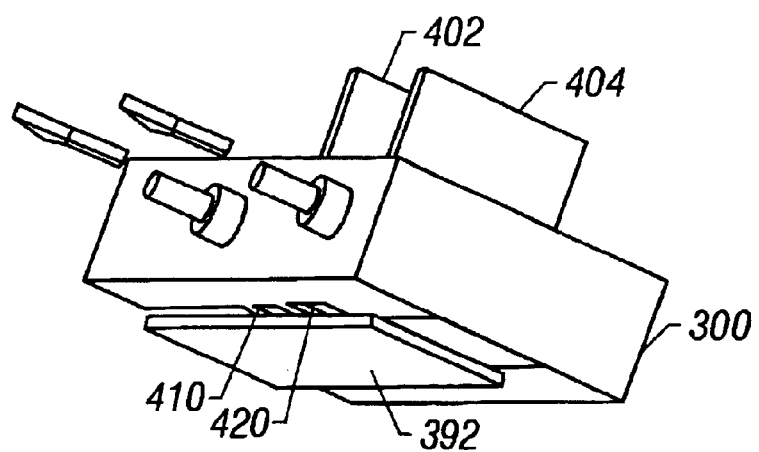
FIG. 4 shows an up-side down view of the airflow fixture of FIGS. 3A–3C.

Referring to FIG. 4, in this alternative embodiment, fixture 300 includes a set of plungers 402 and 404 which can be pushed through openings 410 and 420, formed through the back surface to the top surface of fixture 300, to contact and remove fibers 360 and substrate 392 from fixture 300.

Airflow connectors 140 and 142, 240 and 242, and 340 and 342, described above, are all attached to a side surface of fixture 100, 200 and 300, respectively, and are connected by internal airflow channels to individual airflow openings in the top surface of fixture 100, 200 and 300, respectively. The amount of airflow into each airflow opening may be controlled individually by varying the airflow out of the corresponding airflow connector.

In the embodiments discussed above, the shape of the airflow openings in the top surface of fixtures 100, 200 and 300, are rectangular relative to the top surface of the fixture, with the longest sides of the openings being roughly perpendicular to the longitudinal axis of the grooves and the fibers being placed. The length of the longer-sides of the openings is slightly longer than the combined width of the diameters of the set of fibers being placed when all of the fibers in the set are placed side-by-side. This longer-side length can be increased to increase access to lift and manipulate the fibers from the side of the set of fibers.

A problem with some bonding materials is that voids remain in the cured bonding material, e.g., air bubbles or impurities. Typically, following bonding and curing, the substrate and fiber ends are 'lapped back' to a desired length and/or angle. The lap back procedure uses a grinding material to grind off and polish the fiber ends and the substrate, and, therefore it exposes voids in the bonding materials. Lapping back a fiber that is near a void in the bonding material may cause the fiber to shift and be damaged. To address the problem of voids in the bonding material, the airflow is left on during the application of the bonding material and the holding cap or holding substrate. The differential pressures created by the airflow cause the bonding material to be drawn into the grooves and along the fibers to even out the application and reduce the number of voids between the fibers, the holding cap or holding substrate.

Though we have described specific embodiments, we do not intend to imply that there are not other ways to implement some of the features of those embodiments. For example, we mentioned epoxy or glue as the means by which various elements are attached to each other. However, any appropriate method that affixes one element to another could be used, such as fusing or soldering. In the described embodiments we mentioned that fibers were aligned on, or transferred to, a substrate. However, it would be possible to bond aligned fibers directly to fixture 300, that is, without transferring the aligned fibers to a holding substrate.

If the bonding material requires thermal curing, the substrate and/or the airflow fixture may be placed in an oven to speed the curing. The holding cap or holding substrate may be larger or smaller than shown in the attached figures, and, in the case of aligning etched fibers, may contact not only the aligned etched fiber ends but may also contact the non-etched fiber sections. Also, instead of having an operator position the fibers, an automated mechanical arm with a tool of the appropriate size could be inserted below the fibers to raise, spread and position the fibers. The specific embodiments discussed above include multiple sets of aligned grooves and multiple airflow openings. In fact only a single set of grooves, or a grooved substrate, located next to a single airflow opening may be used. Furthermore, additional airflow openings and sets of grooves other than those described could be used. The specific embodiments described the use of a grooved substrate, however, it is possible that a substantially flat substrate could be used to bond fibers where one or more sets of grooves (to align the fibers) is present in the base.

A number of embodiments of the invention have been described. Nevertheless, it will be understood that various modifications may be made without departing from the spirit and scope of the invention. Accordingly, other embodiments are within the scope of the following claims.

What is claimed is:

1. A method of aligning fibers on a substrate comprising:

placing a grooved substrate on a base proximate to an opening formed through a top surface of the base;

flowing air through the opening to draw the plurality of fibers down towards the top surface of the substrate;

placing a plurality of fibers to extend over the substrate and over the opening; and bonding the plurality of fibers to the substrate, wherein the base includes a substrate holding area formed in the top surface of the base and proximate to the opening, and wherein said placing a substrate on a base further comprises:

placing the substrate within the substrate holding area, wherein the substrate includes a first plurality of grooves formed in a top surface of the substrate and wherein said placing a plurality of fibers further comprises:

placing one of the plurality of fibers within one of the first plurality of grooves, and wherein the opening is horizontally longer in a first dimension than a second dimension relative to the top surface of the base, and wherein said placing the substrate within the substrate holding area further comprises:

placing the substrate proximate to a side of the opening of the first dimension, wherein the first plurality of grooves are substantially perpendicular to the side of the first dimension.

2. The method of claim 1 wherein the base includes a second plurality of grooves formed in the first surface of said base that are spaced from the substrate holding area, wherein the second plurality of grooves are in substantial alignment with the first plurality of grooves in the top surface of the substrate, and wherein said placing one of the plurality of fibers further comprises:

placing a first section of one of the plurality of fibers within one of the first plurality of grooves formed in the top surface of the substrate; and placing a second section of the same one of the plurality of fibers within a corresponding one of the second plurality of grooves formed in the first surface of the base.

3. A method of aligning fibers on a substrate comprising:

placing a grooved substrate on a base proximate to an opening formed through a top surface of the base;

flowing air through the opening to draw the plurality of fibers down towards the top surface of the substrate;

placing a plurality of fibers to extend over the substrate and over the opening; and bonding the plurality of fibers to the substrate, wherein the base includes a substrate holding area formed in the top surface of the base and proximate to the opening, and wherein said placing a substrate on a base further comprises:

placing the substrate within the substrate holding area, wherein the substrate includes a first plurality of grooves formed in a top surface of the substrate and wherein said placing a plurality of fibers further comprises:

placing one of the plurality of fibers within one of the first plurality of grooves, and wherein the substrate includes a second plurality of grooves formed in the top surface of the substrate that are spaced from the first plurality of grooves, wherein the second plurality of grooves are in substantial alignment with the first plurality of grooves, and wherein said placing one of the plurality of fibers further comprises:

placing a first section of one of the plurality of fibers within one of the first plurality of grooves; and placing a second section of the same one of the plurality of fibers within a corresponding one of the second plurality of grooves formed in the top surface of the substrate.

4. The method of claim 2 or 3 further comprising:

applying a bonding material on the plurality of fibers; and placing a holding cap in contact with the bonding material.

5. A method of aligning fibers comprising:

placing a plurality of fibers on a base to extend over an opening formed through a top surface of the base;

flowing air through the opening to draw the plurality of fibers down towards the top surface of the base;

positioning each of the plurality of fibers in substantial alignment; and transferring the plurality of fibers to a substrate, wherein the base includes a first plurality of grooves formed in the top surface proximate to the opening, said method further comprising:

placing one of the plurality of fibers within one of the first plurality of grooves, wherein the base includes a second plurality of grooves formed in the first surface that are spaced from the first plurality of grooves, and wherein said placing one of the plurality of fibers further comprises:

placing a first section of one of the plurality of fibers within one of the first plurality of grooves; and placing a second section of the same one of the plurality of fibers within a corresponding one of the second plurality of grooves, wherein said transferring further comprises:

positioning a first surface of a substrate to contact the plurality of fibers, wherein the first surface of the substrate has a bonding material applied to contact the plurality of fibers.

6. The method of claim 5 wherein the opening is horizontally longer in a first dimension than a second dimension relative to the top surface of the base, and wherein said placing a plurality of fibers further comprises:

placing the plurality of fibers substantially perpendicular to a side of the opening of the first dimension.

7. The method of claim 5 wherein the base includes a plunger slidably coupled to the base, and wherein said transferring the plurality of fibers to a substrate further comprises:

sliding the plunger to contact one of the plurality of fibers and the substrate.

* * * * *